United States Patent [19]

Kondo

[11] Patent Number: 4,958,929
[45] Date of Patent: Sep. 25, 1990

[54] OPTICAL FIBER SENSOR
[75] Inventor: Michio Kondo, Nagoya, Japan
[73] Assignee: Brother Kogyo Kabushiki Kaisha, Aichi, Japan
[21] Appl. No.: 306,165
[22] Filed: Feb. 6, 1989
[30] Foreign Application Priority Data Feb. 10, 1988 [JP] Japan .................................. 63-29313

[51] Int. Cl.[5] ............................................. G01B 9/02
[52] U.S. Cl. .................................. 356/345; 356/349; 356/351
[58] Field of Search ........................ 356/345, 349, 351
[56] References Cited
U.S. PATENT DOCUMENTS 4,652,129 3/1987 Martinelli ............................ 356/345

Primary Examiner—Davis L. Willis
Assistant Examiner—Matthew W. Koren
Attorney, Agent, or Firm—Oliff & Berridge

[57] ABSTRACT

An optical fiber sensor including an optical fiber for transmitting first and second linearly polarized laser beams in respective two modes having mutually perpendicular polarization planes, a light transmitter/receiver portion for producing the linearly polarized beams having different frequencies, and directing the beams to the optical fiber for propagation of the beams toward a distal end of the fiber, and a sensor head portion optically connected to the distal end of the fiber. The transmitter/receiver portion receives a reference and a measuring beam which have been returned through the fiber. The head portion receives the first and second beams from the distal end of the fiber, and splits the received beams into the reference and measuring beams, such that each of the reference and measuring beams consists of two components having mutually perpendicular polarization planes. The head portion causes at least the measuring beam to be influenced by an external subject, combines the reference and measuring beams, and returns the combined beams to the transmitter/receiver portion. The head portion includes a device for rotating by 90 degrees the polarization planes of the two components of one of the reference and measuring beams, in opposite directions, before the reference and measuring beams are combined and returned in the second direction.

8 Claims, 7 Drawing Sheets

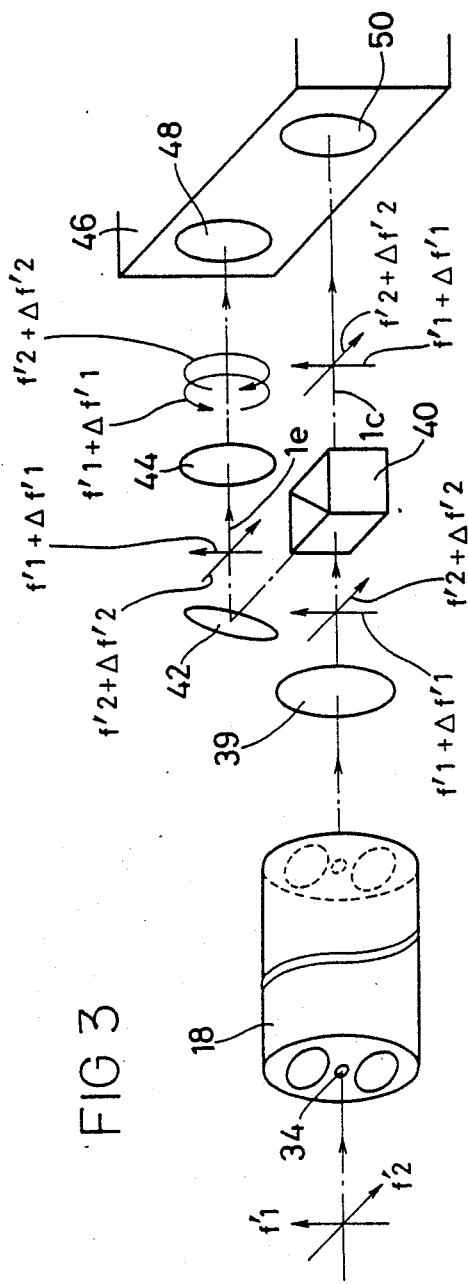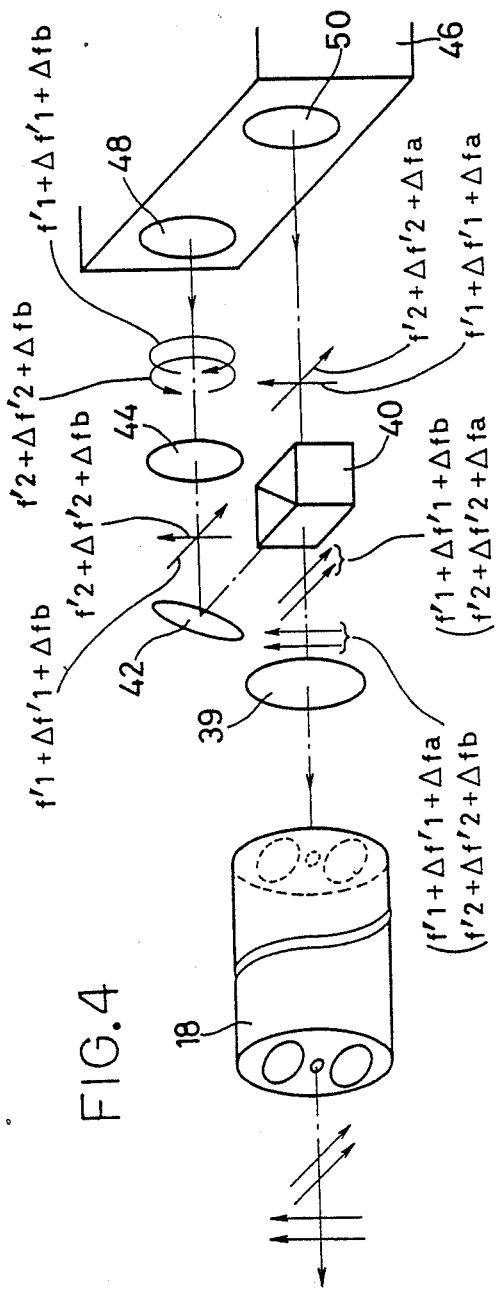

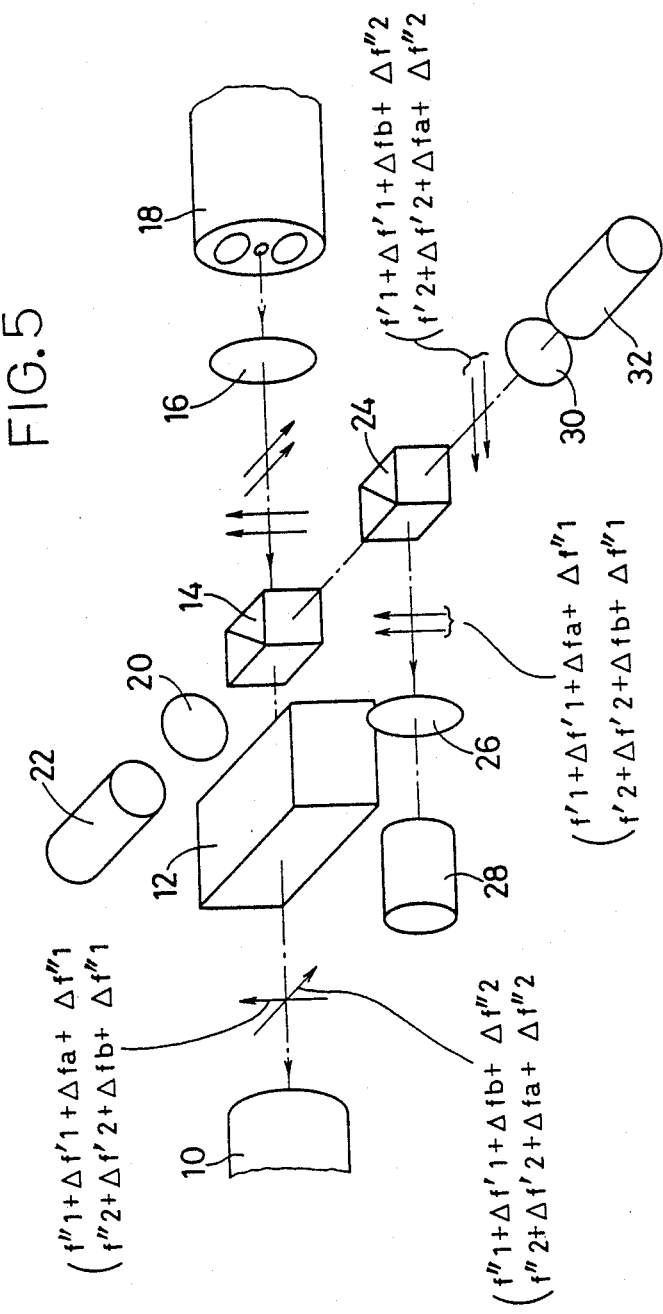

OPTICAL FIBER SENSOR

BACKGROUND OF THE INVENTION

1. Field of the Invention

The present invention relates to an optical fiber sensor which includes a light transmitter/receiver portion, an optical sensor head portion remote from the transmitter/receiver portion, and an optical fiber or fibers for optically coupling the transmitter/receiver portion and the sensor head portion.

2. Discussion of the Prior Art

For effecting precise measurement of physical quantities such as length, angle and pressure, it is proposed to use an optical measuring system or apparatus which includes a light transmitter/receiver portion having a light source and a light detector, and a sensor head portion optically coupled with the transmitter/receiver portion. The light source produces a reference beam and a measuring beam, and the sensor head portion is adapted to cause a transmission parameter of at least the measuring beam to be influenced by a change of an external subject or condition. The influenced measuring beam and the influenced or non-influenced reference beam are returned from the sensor head portion to the light detector of the transmitter/receiver portion, so that the change of the external subject is detected based on the received measuring and reference beams.

An example of such an optical measuring system is illustrated in FIG. 10, wherein a He-Ne laser source 70 of frequency-stabilized type produces a first and a second linearly polarized beams, under the control of a laser tuning circuit 69. The first and second linearly polarized beams have different frequencies f1, f2 and mutually perpendicular polarization planes. Each of these beams is split by a reference beam splitter 71 into two components. One of the two components which is reflected by the beam splitter 71 is split by a beam splitter 66 into two halves, one of which is received by a feedback photosensor 67, and the other of which is received by a reference photosensor 72 via a mirror 68. The other component of each of the first and second linearly polarized beams which is transmitted through the reference beam splitter 71 is split by a polarizing beam splitter 73, into a reference beam having the frequency f2 and a measuring beam having the frequency f1. The reference beam is reflected by a stationary mirror 74, while the measuring beam is reflected by a movable mirror 75. These reflected reference and measuring beams are combined with each other by the polarizing beam splitter 73, and the composite beam is received by a first photosensor 76. This first photosensor 76 detects a beat frequency of the received reference and measuring beams. Since the frequency of the received measuring beam was shifted or changed by $\Delta f1$ due to Doppler effect by a movement of the movable mirror 75, the beat frequency detected by the first photosensor 76 is equal to $f2-(f1\pm\Delta F1)$. On the other hand, the beat frequency detected by the reference photosensor 72 is equal to $f2-f1$. The outputs of the photosensors 72, 76 are applied to an output device 77 which incorporates a pulse converter which produces a pulse each time the movable mirror 75 is moved by an amount corresponding to $\lambda/2$. The output device 77 further incorporates a counter for counting the number of the pulses produced by the pulse converter, and thereby accurately calculating a difference $\Delta f1$ between the beat frequencies detected by the photosensors 72, 76. In this arrangement, the polarizing beam splitter 73, fixed mirror 74 and movable mirror 75 constitute a sensor head portion which is remote from a light transmitter/receiver portion, which includes the other components illustrated in FIG. 10.

In the optical measuring system as described above, however, the light beams are transmitted or propagated through the atmosphere between the light transmitter/receiver portion and the sensor head portion. Therefore, a space through which the optical paths extend should be free from any obstacle disturbing the optical paths. Further, the beams propagated through the optical paths are influenced by streams of the atmosphere, whereby the measuring accuracy is lowered. The use of suitable covering means for surrounding and protecting the optical paths inherently results in increased size and cost of manufacture of the measuring system.

SUMMARY OF THE INVENTION

It is accordingly an object of the present invention to provide a relatively small-sized, inexpensive optical fiber sensor which uses optical fiber or fibers for optically coupling a light transmitter/receiver portion and a sensor head portion, and which is capable of accurately detecting a change of an external subject based on reference and measuring beams at least one of which is influenced by the external subject at the sensor head portion and which are received by the transmitter/receiver portion.

The above object may be achieved according to the principle of the present invention, which provides an optical fiber sensor comprising optical fiber means, a light transmitter/receiver portion, and a sensor head portion optically connected to the light transmitter/receiver portion by the optical fiber means.

The optical fiber means is adapted to transmit a first and a second linearly polarized laser beam in a first and a second transmission mode which have mutually perpendicular polarization planes, such that the polarization planes are maintained. The light transmitter/receiver portion is adapted to produce the first and second linearly polarized beams such that the beams have different frequencies. The first and second linearly polarized beams are directed to the optical fiber means so that the beams are transmitted in the respective two transmission modes in a first direction from a proximal end of the optical fiber means to a distal end thereof. The light transmitter/receiver portion receives and detects a reference and a measuring beam which have been returned through the optical fiber means in a second direction from the distal end toward the proximal end.

The sensor head portion is operable to receive the first and second linearly polarized beams transmitted through the optical fiber means in the first direction, and split the received beams into the reference and measuring beams, such that each of the reference and measuring beams consists of two components having mutually perpendicular polarization planes corresponding to those of the first and second linearly polarized beams. The sensor head portion causes and permits a transmission parameter of at least the measuring beam to be influenced by a change of an external subject, combines the reference and measuring beams, and returns the combined beams to the light transmitter/receiver portion through the optical fiber means in the second direction.

The sensor head portion includes means for rotating by 90 degrees the polarization planes of the two components of one of the reference and measuring beams, in opposite directions, before said one of the reference and measuring beams is incident upon the distal end of the optical fiber means in the second direction and transmitted through the optical fiber means in the second direction to the light transmitter/receiver portion.

In the optical fiber sensor of the present invention constructed as described above, the first and second linearly polarized beams received by the sensor head portion are split into the reference and measuring beams, each consisting of two components having mutually perpendicular polarization planes corresponding to those of the first and second linearly polarized beams. After the transmission parameter of at least the measuring beam is influenced by a change of the external subject, the polarization planes of the two components of said one of the reference and measuring beams are rotated by 90 degrees in the opposite directions, before the reference and measuring beams are combined and returned through the optical fiber means in the second direction.

Suppose the frequencies of the first and second linearly polarized beams produced by the transmitter/receiver portion are f1 and f2, respectively, the frequencies of these beams received by the sensor head portion are f1+Δf'1, and f2+Δf'2, where Δf'1 and Δf'2 are amounts of frequency shifts of the beams during propagation of the beams through the optical fiber means in the first direction. The frequencies of the reference and measuring beams influenced by the change of the external subject and transmitted through the optical fiber means in the second direction are f1+Δf'1+Δfa, and f2+Δf'2 and Δfb, respectively, where Δfa and Δfb are amounts of frequency shifts of the measuring beam by the influence of the external subject. Since the polarization planes of the two components of one of the reference and measuring beams are rotated by 90 degrees, the values f1, f2, Δf'1 and Δf'2 of the two components of the reference and measuring beams having the same polarization planes (e.g., vertical plane) are counterbalanced by those of the other two components having the same polarization planes (e.g., horizontal plane), when the transmitter/receiver portion receives the reference and measuring beams from the optical fiber means, for obtaining a beat frequency of the above-indicated two pairs of components of the reference and measuring beams. Namely, the beat frequency is obtained from the amount (Δfa−Δfb), and is not influenced by the frequencies f1, f2 and the frequency shift amounts Δf'1, Δf'2, nor by frequency shift amounts Δf"1, Δf"2 which occur during propagation of the reference and measuring beams through the optical fiber means in the second direction toward the transmitter/receiver portion. Thus, the amount of influence of the measuring beam, i.e., an amount of linear or angular displacement or a change in refractive index of the external subject may be precisely determined by detecting a change in the beat frequency obtained by the transmitter/receiver portion.

Since the light transmitter/receiver portion and the sensor head portion are optically connected by the optical fiber means, the measurement is not influenced by streams of the ambient air or atmosphere surrounding the sensor or optical fiber means. Further, the instant optical fiber sensor eliminates a covering for enclosing the system, and is therefore made small-sized and available at a relatively reduced cost.

In one form of the invention, the optical fiber means may consist of a single optical fiber. In one arrangement of this form of the invention, the light transmitter/receiver portion may comprise a laser source for producing the first and second linearly polarized beams, a non-polarizing beam splitter disposed between the laser beam and the proximal end of the optical fiber, a polarizing beam splitter for receiving the reference and measuring beams which have been reflected by the non-polarizing beam splitter, a first photosensor for receiving one of the two components of the reference beam and one of the two components of the measuring beam having the same polarization plane as said one component of the reference beam, a second photosensor for receiving the other components of the reference and measuring beams, and a detecting circuit for obtaining a difference between output frequencies of the first and second photosensors.

In another arrangement of the above form of the invention, the sensor head portion may comprise a non-polarizing beam splitter receiving the first and second linearly polarized beams from the distal end of the optical fiber, and splitting the received first and second linearly polarized beams into the reference and measuring beams such that one of the reference and measuring beams is transmitted through the non-polarizing beam splitter while the other of the reference and measuring beams is reflected by the non-polarizing beam splitter. The sensor head portion further comprises a mirror for reflecting the other of the reference and measuring beams, in a direction parallel to a direction of propagation of the one of the reference and measuring beams.

In another form of the invention, the optical fiber means may consist of a first optical fiber for transmitting the first and second linearly polarized beams in the first direction, and a second optical fiber for transmitting the reference and measuring beams in the second direction.

In one arrangement of the above form of the invention, the light transmitter/receiver portion may comprise a laser source for producing the first and second linearly polarized beams, a polarizing beam splitter for receiving the reference and measuring beams which have been emitted from the proximal end of the second optical fiber in the second direction, a first photosensor for receiving one of the two components of the reference beam and one of the two components of the measuring beam having the same polarization plane as said one component of the reference beam, a second photosensor for receiving the other components of the reference and measuring beams, and a detecting circuit for obtaining a difference between output frequencies of the first and second photosensors.

In another arrangement of the same form of the invention, the sensor head portion may comprise a non-polarizing beam splitter receiving the first and second linearly polarized beams from the distal end of the first optical fiber, and splitting the received first and second linearly polarized beams into the reference and measuring beams such that one of the reference and measuring beams is transmitted through the non-polarizing beam splitter while the other of the reference and measuring beams is reflected by the non-polarizing beam splitter. The sensor head portion further comprises a first mirror for reflecting the other of the reference and measuring beams, in a direction parallel to a direction of propagation of the one of the reference and measuring beams, and a second mirror for reflecting the reference and measuring beams which have been transmitted through and reflected by the non-polarizing beam splitter. The reference and measuring beams reflected by the second mirror are directed to the distal end of the second optical fiber.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which:

FIGS. 2, 3, 4 and 5 are views explaining an operation of the optical fiber sensor of FIG. 1;

DETAILED DESCRIPTION OF THE PREFERRED EMBODIMENTS

Figure 1:
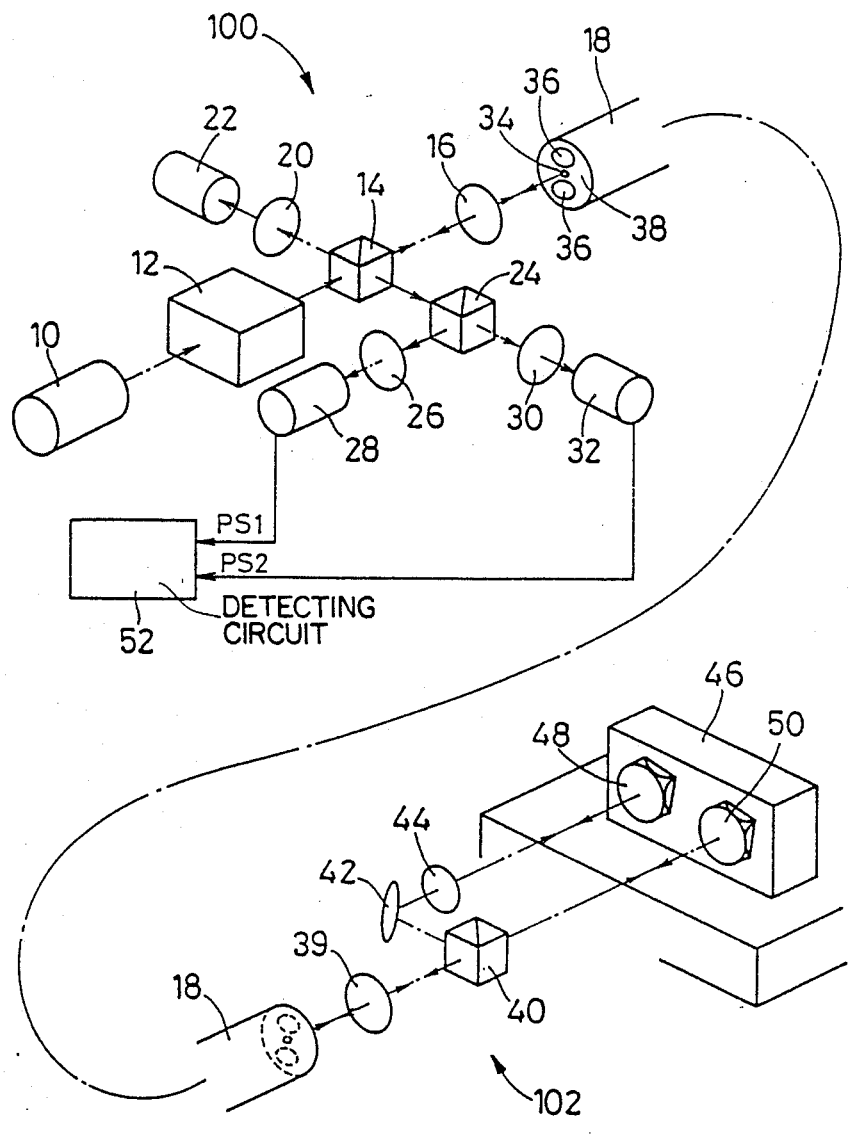
FIG. 1 is a schematic perspective view showing one embodiment of an optical fiber sensor of the present invention.

Referring first to FIG. 1, reference numeral 10 denotes a laser source in the form of a He-Ne laser of the horizontal Zeeman type capable of producing two linearly polarized laser beams whose frequencies are different from each other and whose polarization planes are perpendicular to each other. The linearly polarized beams are incident upon an end face of an optical fiber 18, through a ultrasonic modulator 12, a non-polarizing beam splitter 14 and a converging lens 16. The optical fiber 18 is capable of transmitting the laser beams without changing their polarization planes. In this sense, the optical fiber 18 will be referred to as "fixed-polarization-plane optical fiber", when appropriate. The non-polarizing beam splitter 14 reflects a component of each linearly polarized laser beam from the ultrasonic modulator 12, and the reflected component is received by a monitoring photosensor 22 through a converging lens 20.

The ultrasonic modulator 12 is provided to prevent instability of laser generation by the laser source 10 due to the reflected beam from the optical fiber 18. The ultrasonic modulator 12 consists of a a substrate which is a single crystal of tellurium dioxide or molybdate or formed of a glass material, and a piezoelectric element provided on the substrate. The piezoelectric element produces an acoustic wave, so that the refractive index of the substrate is periodically changed, whereby the incident laser beams are diffracted by means of Raman-Nath diffraction. The diffracted beams are subject to a sort of Doppler effect by the ultrasonic wave, whereby the frequencies of the beams are shifted by a multiple of the frequency of the ultrasonic wave. Accordingly, the laser beams that are returned from the optical fiber 18 and are incident upon the laser source 10 through the ultrasonic modulator 12 have frequencies which are greatly different from the frequencies of the laser beams generated by the laser source 10. Thus, the operation of the laser source 10 is not adversely influenced by the reflected beams from the optical fiber 18.

The laser beams having the mutually perpendicular polarization planes returned from the optical fiber 18 are converted into parallel rays by the converging lens 16, and are reflected by the non-polarizing beam splitter 14 and received by a polarizing beam splitter 24. Each of the beams incident upon the beam splitter 24 are split into two components, one of which is received by a first photosensor 28 through a converging lens 26, and the other of which is received by a second photosensor 32 through a converging lens 30.

In the present embodiment, the optical elements described above constitute a light transmitter/receiver portion 100 of the optical fiber sensor. The light transmitter/receiver portion 100 is accommodated in a suitable housing, to which is secured the proximal end of the optical fiber 18 having the end face indicated above.

The fixed-polarization-plane optical fiber 18 consists of a core 34, a pair of stressing portions 36 sandwiching the core 34, and a clad 38 which covers the core and stressing portions 34, 36. The optical fiber 18 is capable of transmitting polarized beams such that the polarization planes of the two modes $HE_{11}^x$ and $He_{11}^y$ perpendicular to each other are maintained. Since the two linearly polarized laser beams from the laser source 10 have the mutually perpendicular planes of polarization and have different frequencies, these laser beams incident upon the end face of the optical fiber 18 are propagated through the optical fiber 18, in the two modes $HE_{11}^x$ and $He_{11}^y$.

The distal end of the optical fiber 18 is attached to a frame of an optical sensor head portion 102. The two modes $HE_{11}^x$ and $He_{11}^y$ are emitted from the distal end face of the fiber 18, and coverted into parallel rays of light by a converging lens 39. The parallel rays of the two modes are then incident upon a non-polarizing beam splitter 40, whereby each of the two modes incident upon the beam splitter 40 is split into a linearly polarized reference beam and a linearly polarized measuring beam. Each of these beams consists of two modes which have mutually perpendicular polarization planes corresponding to those of the two modes $He_{11}^x$, $He_{11}^y$. The measuring beam reflected by the non-polarizing beam splitter 40 is reflected by a mirror 42 and is received through a ¼ waveplate 44 by a first corner cube prism 48 fixed on a subject 46. The measuring beam is reflected by the first corner cube prism 48, and is again incident upon the ¼ waveplate 44. Thus, the measuring beam is transmitted through the ¼ waveplate two times in the opposite direction. As a result, the polarization plane of the measuring beam which has been transmitted through the ¼ waveplate 44 the second time is rotated 90 degrees with respect to that of the measuring beam which is reflected by the mirror 40 and incident upon the ¼ waveplate. The reference beam which has been transmitted through the non-polarizing beam splitter 40 is directed toward a second corner cube prism 50, in parallel with the measuring beam. The first and second corner cube prisms 48, are coated with a metallic film, so that the reflected beams maintain the same polarization characteristics.

In the present embodiment, the convering lens 39, non-polarizing beam splitter 40, mirror 42 and ¼ waveplate 44 constitute the optical sensor head portion 102 of the optical fiber sensor. The ¼ waveplate 44 serves as means for rotating by 90 degrees the polarization planes of the two components of the measuring beam which has been reflected by the first corner cube prism 48, with respect to those of the components which were incident upon the ¼ waveplate 44 in the direction from the mirror 42 toward the first corner cube prism 48. Namely, the horizontal and vertical polarization planes of the two components of the measuring beam which have been transmitted through the ¼ waveplate 44 in the direction toward the mirror 42 are reversed with respect to those which were incident upon the ¼ waveplate 44 in the direction toward the first corner cube prism 48.

There will be described in detail an operation of the instant optical fiber sensor.

Figure 2:
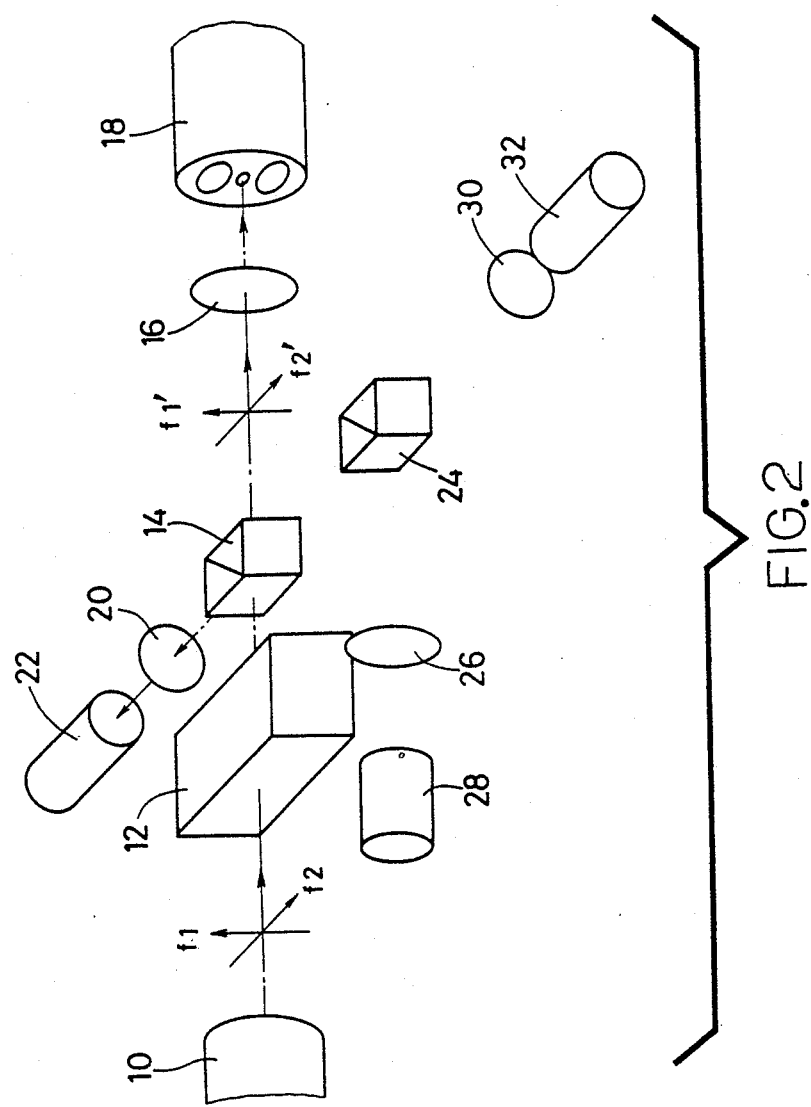

Referring to FIG. 2, the linearly polarized laser beams f1, f2 having the mutually perpendicular polarization planes and different frequencies, which have been emitted by the laser source 10, are transmitted through the ultrasonic modulator 12, whereby the frequencies of the laser beams f1, f2 are shifted so as to provide linearly polarized laser beams f1', f2' having frequencies f'1, f'2. A component of each linearly polarized laser beam f1', f2' is reflected by the non-polarizing beam splitter 14 and is received by the monitoring photosensor 22. The monitoring photosensor 22 produces output signals corresponding to the output levels of the two linearly polarized laser beams f1, f2, and is connected to a laser regulating device (not shown). The laser regulating device controls the outputs of the laser beams, based on the output signals from the monitoring photosensor 22, so that the laser outputs are stabilized. A component of each linearly polarized laser beam f1', f2' which has been transmitted through the non-polarizing beam splitter 14 is converged by the converging lens 16, and is incident upon the end face of the fixed-polarization-plane optical fiber 18. The laser beams f1', f2' are propagated through the optical fiber 18 in the two modes $HE_{11}^x$ and $HE_{11}^y$, while the polarization planes are maintained. Arrow-headed lines perpendicular to each other indicated in FIG. 2 indicate the planes of polarization of the laser beams f1, f2, f1', f2'.

As indicated in detail in FIG. 3, the laser beams emitted from the other end of the optical fiber 18 are converted into parallel rays of light. Since the frequencies of the laser beams f'1, f'2 are shifted by $\Delta f'1$ and $\Delta f'2$ during propagation through the optical fiber 18, the frequencies of the emitted laser beams from the optical fiber 18 amount to $f'1+\Delta f'1$, and $f'2+\Delta f'2$, respectively. Each frequency-shifted laser beam is split by the non-polarizing beam splitter 40, into two halves. The beams reflected by the non-polarizing beam splitter 40 serves as the measuring beam indicated at 1e in FIG. 3, while the beam transmitted through the beam splitter 40 serves as the reference beam indicated at 1c in FIG. 3. Each of the measuring and reference beams 1e, 1c consists of two components which have mutually perpendicular polarization planes and frequencies $f'1+\Delta f'1$, and $f'2+\Delta f'2$. Certainly, the measuring and reference beams 1e and 1c may be reversed with respect to the reflection and transmission of the beams by and through the beam splitter 40.

Since the two components of the measuring beam 1e have the mutually perpendicular polarization planes, these components are converted by the ¼ waveplate 44 into respective clockwise-rotated and counterclockwise-rotated circularly polarized beams, as seen in the direction of propagation of the beams, as indicated in FIG. 3. These circular polarized beams are incident upon and reflected by the first corner cube prism 48. The two components beams of the reference beam 1c are incident directly upon the second corner cube prism 50, and reflected by the same.

Referring to FIG. 4, the clockwise-rotated and counterclockwise-rotated circularly polarized beams are reflected by the first corner cube prism 48, as seen in the direction of propagation of the beams, which are again transmitted through the ¼ waveplate 44, whereby these circularly polarized beams are converted into the respective two linearly polarized components of the measuring beam 1e, whose polarization planes are rotated by 90 degrees in the opposite directions, with respect to those of the components which were incident upon the ¼ waveplate 44 in the direction toward the prism 48. In other words, the component of the linearly polarized measuring beam 1e of the frequency $f2'+\Delta f2'$ which had the horizontal polarization plane is converted by the ¼ waveplate 44 into the component having the vertical polarization plane, while the component of the measuring beam of the frequency $f1'+\Delta f1'$ which had the vertical polarization plane is converted by the ¼ waveplate 44 into the component having the horizontal polarization plane. On the other hand, the polarization planes of the two components of the linearly polarized reference beam 1c reflected by the second corner cube prism 50 are not rotated.

The frequencies of the reference and measuring beam 1c, 1e reflected by the second and first corner cube prisms 50, 48 are shifted or changed, by $\Delta fa$ and $\Delta fb$, respectively, depending upon an amount of displacement or rotation of the subject 46. Therefore, the linearly polarized measuring beam 1e transmitted through the ¼ waveplate 44 consists of the component having the frequency $f'2+\Delta f'2+\Delta fb$ and the vertical polarization plane, and the component having the frequency $f'1+\Delta f'1+\Delta fb$ and the horizontal polarization plane. The linearly polarized reference beam 1c reflected by the second corner cube prism 50 consists of the component having the frequency $f'1+\Delta f'1+\Delta fa$ and the vertical polarization plane, and the component having the frequency $f'2+\Delta f'2+\Delta fa$ and the horizontal polarization plane.

When the linearly polarized reference and measuring beams 1c, 1e are combined with each other at the non-polarizing beam splitter 40, the two components having the vertical polarization planes combine into a composite linearly polarized beam having the vertical polarization plane, while the other two components having the horizontal polarization planes combine into a composite linearly polarized beam having the horizontal polarization plane.

The composite beams indicated above are propagated through the fixed-polarization-plane optical fiber 18 in the respective two modes $HE_{11}^x$ and $He_{11}^y$, back to the non-polarizing beam splitter 14, while the polarization planes are maintained. The composite beams are then reflected by the beam splitter 14, and are incident upon the polarizing beam splitter 24, whereby the incident beams are split into the linearly polarized components having the vertical polarization planes, and the linearly polarized components having the horizontal polarization planes, as indicated in FIG. 5. Since each component is subject to a frequency shift by $\Delta f''1$ and $\Delta f''2$, during propagation through the optical fiber 18, the frequences of the two linearly polarized components having the vertical polarization planes which have been reflected by the beam splitter 24 are f1+Δ'1+Δfa+Δf''1, and f2+Δf2+Δfb+Δf''1, respectively. Similarly, the frequencies of the two linearly polarized components having the horizontal polarization planes which have been transmitted through the beam splitter 24 are f1+Δf1+Δfb+Δf''2 and f2+Δf2+Δfa+Δf''2, respectively. The two components having the vertical polarization planes interfere with each other, resulting into a beam whose optical intensity is modulated by a beat frequency expressed by the equation (b 1) given below, while the the other two components having the horizontal polarization planes interfere with each other, resulting into a beam whose optical intensity is modulated by a beat frequency expressed by the equation (2) also indicated below. With these two beams received by the respective first and second photosensors 28, 32, the photosensors 28 and 30 respectively produce respective first and second electric signals PS1 and PS2 which have the beat frequencies of the equations (1) and (2).

$$f1+\Delta f1+\Delta fa+\Delta f''1 \\ -(f2+\Delta f2+\Delta fb+\Delta f''1)=(f1-f2)+(\Delta f1-\Delta f'2)+(\Delta fa-\Delta fb) \quad (1)$$

$$f1+\Delta f1+\Delta fb+\Delta f''2-(f2+\Delta f2+\Delta fa+\Delta f''2)=(f'1-F'2)+(\Delta f1-\Delta f'2)-(\Delta fa-\Delta fb) \quad (20)$$

The electric signals PS1 and PS2 are applied to a detecting circuit 52, as shown in FIG. 1. The detecting circuit 52 obtains a difference between the first and second electric signals PS1, PS2, which is indicative of a phase difference of the beams received by the two photosensors 28, 32. Described more specifically, the difference may be calculated with high accuracy, by counting clock pulses which are generated from a gate which is open for a time duration which corresponds to the difference. Thus, a difference between amounts of displacements of the first and second corner cube prisms 48, 50, i.e., an angle of rotation of the subject 46, may be calculated based on the obtained difference between the first and second electric signals PS1 and PS2. Namely, a difference between the two beat frequencies represented by the equations (1) and (2), which is represented by the following equation (3), corresponds to the difference between the two amounts of displacement of the corner cube prisms 48, 50:

$$\int (\Delta Fa - \Delta fb) dt \quad (3)$$

In the instant optical fiber sensor, the light transmitter/receiver portion 100 and the sensor head portion 102 are optically connected by the single fixed-polarization-plane optical fiber 18. Accordingly, a space through which the optical fiber 18 extends may be occupied by other members. Further, the sensor is not influenced by streams of the atmosphere surrounding the optical fiber, and does not require a cover for covering the optical path. Accordingly, the optical fiber sensor may be designed compact and available at a relatively low cost.

Further, the frequency shifts Δf1 and Δf2 which occur due to strain of the core 34 of the optical fiber may be eliminated upon processing of the beat frequency signals PS1, PS2 generated by the first and second photosensors 28, 32, because the polarization planes of the two components of the linearly polarized measuring beam 1e reflected by the first corner cube prism 48 are rotated through 90 degrees in the opposite directions by the ¼ waveplate 44, before these components of the beam 1e are combined with the two components of the reference beam 1c, by the non-polarizing beam splitter 40.

A modified embodiment of the present invention will be described, by reference to FIG. 6. For easier understanding, the same reference numerals as used in the preceding figures will be used in FIG. 6, to identify the corresponding elements.

Figure 6:
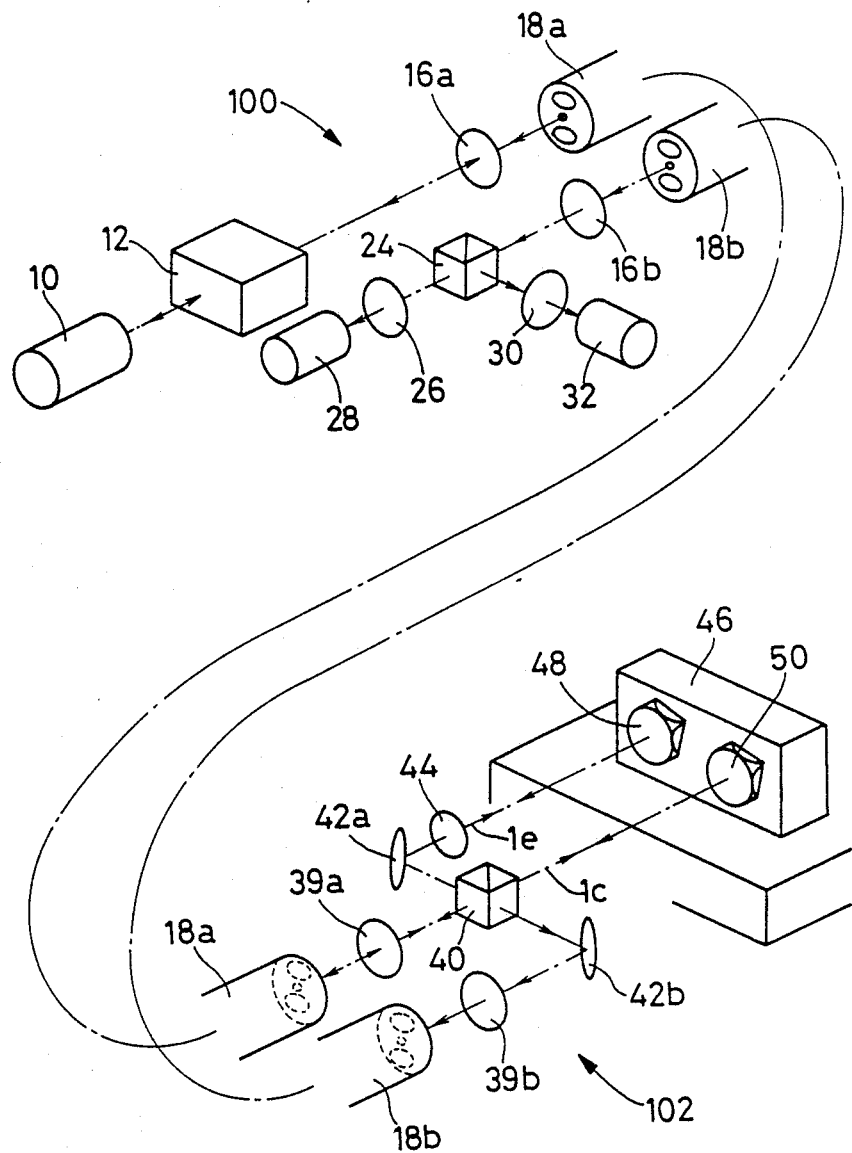
FIG. 6 is a schematic perspective view showing a modified embodiment of an optical fiber sensor of the present invention.
Figure 7:
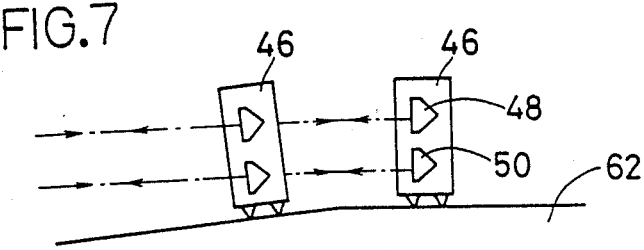
FIGS. 7, 8 and 9 are views explaining applications of the optical fiber sensor of FIG. 1 other than the FIGS. 2-6, showing measurement of straightness of a surface plate, displacement of a table and length of a subject.

The embodiment of FIG. 6 uses a pair of fixed-polariation-plane optical fibers 18a, 18b. The optical fiber 18a is used for transmitting laser beams from a converging lens 16a toward the subject 46, while the optical fiber 18b is used for transmitting the reflected measuring and reference beams 1e, 1c from the subject 46 toward the polarizing beam splitter 24. Described more specifically, the linearly polarized laser beams having the frequencies f1' and f2' are converged by the converging lens 16a, and are incident upon the proximal end face of the optical fiber 18a, whereby the beams are propagated through the optical fiber 18a toward the sensor head portion 102. The beams emitted from the distal end face of the optical fiber 18a are converted into parallel rays by a converging lens 39a, and are split by a non-polarizing beam splitter 40 into the measuring and reference beams 1e, 1c, as in the preceding embodiment. These measuring and reference beams 1e, 1c are reflected by the first and second corner cube prisms 48, 50, respectively, and are combined with each other by the beam splitter 40. The obtained composite beams are reflected by a mirror 42b and are incident upon the distal end face of the optical fiber a converging lens 39b. The composite beam is propagated through the optical fiber 18b back to the light transmitter/receiver portion 100. In the same manner as in the preceding embodiment, the composite beams are converged by a converging lens 16b, on the polarizing beam splitter 24, whereby the beam components having the vertical and horizontal polarization planes are received by the respective first and second photosensors 28, 32, as in the preceding embodiment.

It follows from the above description that the instant embodiment is different from the preceding embodiment, only in that the two optical fibers 18a, 18b are used for transmitting the beams in the different directions to and from the subject 46. Therefore, the instant embodiment of FIG. 6 provides substantially the same advantages as offered by the preceding embodiment. In addition, the non-polariziang beam splitter 14 as used in the preceding embodiment is eliminated in the instant modified embodiment. Accordingly, the optical intensities of the beams received by the first and second photosensors 28, 32 in the present embodiment are increased four times those in the first embodiment.

The optical fiber sensor shown in FIG. 1 may be used to detect the straightness of a surface plate 62, by moving a movable subject 46 on the surface plate 62. In this case, the first and second corner cube prisms 48, 50 are spaced apart from each other in the vertical direction. When the subject 46 is moved on the surface plate 62, a difference between the amounts of displacement of the two prisms 48, 50 is detected by the detecting circuit 52. The detected difference represents the out-of-straightness of the surface of the surface plate 62.

Figure 8:
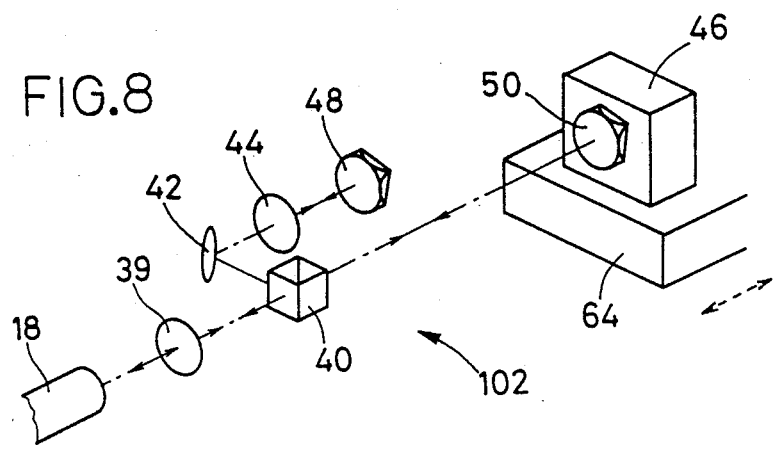

Further, the instant optical sensor may be modified to detect an amount of linear movement of a subject. For instance, if the first prism 48 is secured on the sensor head portion 102 while the second prism 50 is fixed on a surface of a movable table 64, as indicated in FIG. 8, the amount of linear displacement of the table 64 (subject 46 to which the prism 50 is attached) can be accurately detected with high accuracy by the detecting circuit 52.

Figure 9:
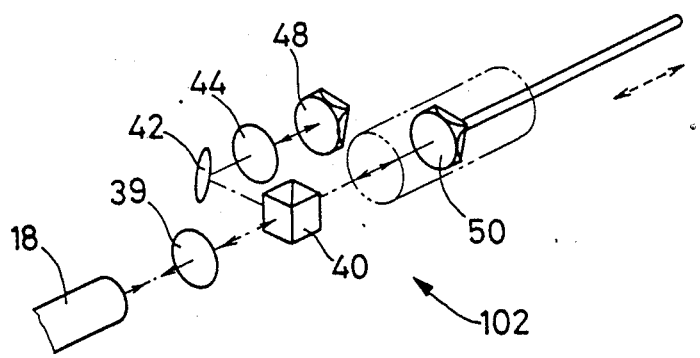
Figure 10:
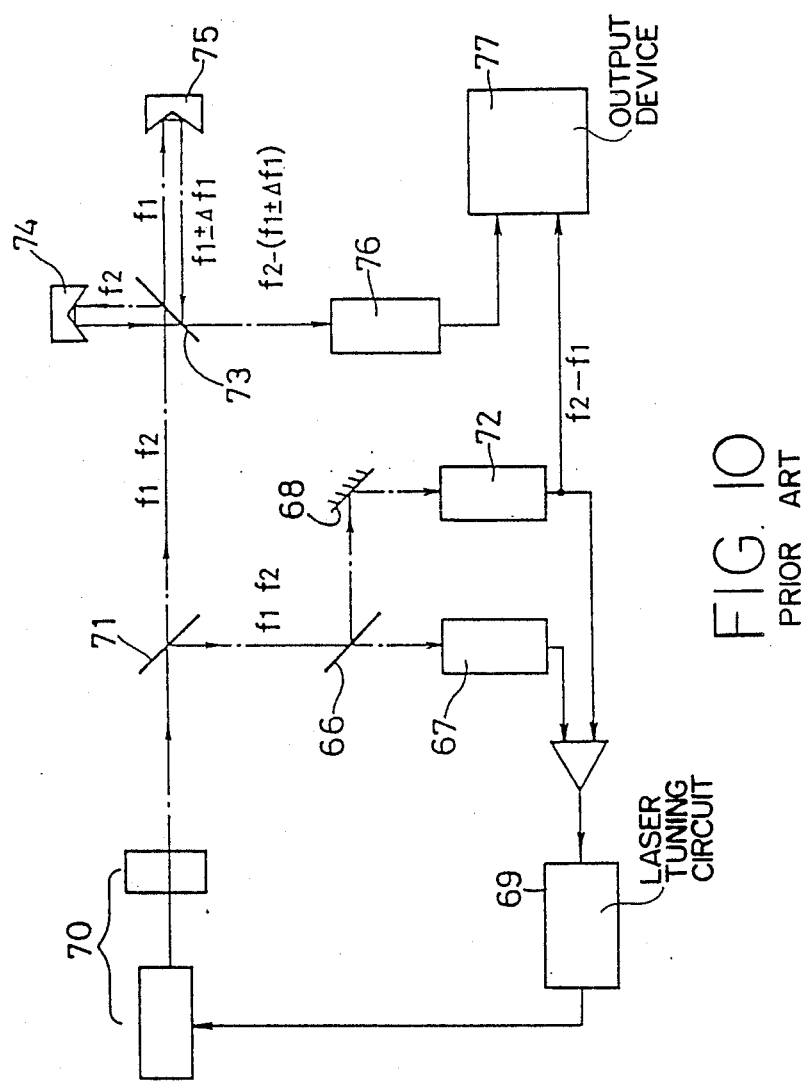
FIG. 10 is a view illustration an arrangement of a conventional optical fiber sensor.

If the second prism 50 is fixed on a movable member such as a slide caliper or micrometer, as illustrated in FIG. 9, lengths can be detected by the detecting circuit 52.

While the present invention has been described in its presently preferred embodiments, it is to be understood that the invention may be otherwise embodied.

In the illustrated embodiments, the measuring and reference beams 1e, 1c are emitted toward the first and second corner cube prisms 48, 50 fixed on the subject 46 or the frame of the sensor head portion 102. However, the sensor head portion may consist of a reflector film which covers the free or distal end face of a fixed-polarization-plane optical fiber. In this case, the measuring and reference beams are reflected by the reflector film of the optical fiber, and the reflected beams are propagated back to the light transmitter/receiver portion. In this case, the phase or other transmission parameter of the beams is changed during propagation through the fiber, by external environmental factors such as a sound pressure or vibrations to which the optical fiber is exposed. Thus, a change in the environmental factor may be detected at the light transmitter/receiver portion 100, based on a change in the transmission parameter of the beams.

While the ¼ waveplate 44 is used in the illustrated embodiment, other suitable optical elements may be used as means for rotating the polarization planes of the beams.

It will be understood that other changes, modifications and improvements may be made in the invention, without departing from the spirit and scope of the invention defined in the following claims. 28

What is claimed is:

1. An optical fiber sensor comprising:
   optical fiber means for transmitting a first and a second linearly polarized laser beam in a first and a second transmission mode which have mutually perpendicular polarization planes, such that said polarization planes are maintained;
   a light transmitter/receiver portion for producing said first and second linearly polarized beams such that said beams have different frequencies, and directing said first and second linearly polarized beams to said optical fiber means so that the beams are transmitted in said respective two transmission modes in a first direction from a proximal end of the optical fiber means to a distal end thereof, said light transmitter/receiver portion receiving and detecting a reference and a measuring beam which have been returned through said optical fiber means in a second direction from said distal end toward said proximal end;
   a sensor head portion operable to receive said first and second linearly polarized beams transmitted through said optical fiber means in said first direction, and split the received beams into said reference and measuring beams, such that each of said reference and measuring beams consists of two components having mutually perpendicular polarization planes corresponding to those of said first and second linearly polarized beams, said sensor head portion causing a transmission parameter of at least said measuring beam to be influenced by a change of an external subject, combining the reference and measuring beams, and returning the combined beams to said light transmitter/receiver portion through said optical fiber means in said second direction; and
   said sensor head portion including means for rotating by 90 degrees the polarization planes of said two components of one of said reference and measuring beams, in opposite directions, before said reference and measuring beams are combined and are incident upon said distal end of said optical fiber means in said second direction, for transmission through said optical fiber means in said second direction.

2. An optical fiber sensor according to claim 1, wherein said optical fiber means consists of a single optical fiber.

3. An optical fiber sensor according to claim 2, wherein said light transmitter/receiver portion comprises a laser source for producing said first and second linearly polarized beams, a non-polarizing beam splitter disposed between said laser beam and said proximal end of said optical fiber, a polarizing beam splitter for receiving said reference and measuring beams which have been reflected by said non-polarizing beam splitter, a first photosensor for receiving one of said two components of said reference beam and one of said two components of said measuring beam having the same polarization plane as said one component of the reference beam, a second photosensor for receiving the other components of said reference and measuring beams, and a detecting circuit for obtaining a difference between output frequencies of said first and second photosensors.

4. An optical fiber sensor according to claim 2, wherein said sensor head portion comprises a non-polarizing beam splitter receiving said first and second linearly polarized beams from the distal end of said optical fiber, and splitting the received first and second linearly polarized beams into said reference and measuring beams such that one of said reference and measuring beams is transmitted through said non-polarizing beam splitter while the other of the reference and measuring beams is reflected by said non-polarizing beam splitter, said sensor head portion further comprising a mirror for reflecting said other of the reference and measuring beams, in a direction parallel to a direction of propagation of said one of the reference and measuring beams.

5. An optical fiber sensor according to claim 1, wherein said optical fiber means consists of a first optical fiber for transmitting said first and second linearly polarized beams in said first direction, and a second optical fiber means for transmitting said reference and measuring beams in said second direction.

6. An optical fiber sensor according to
   optical fiber means for transmitting a first and a second linearly polarized laser beam in a first and second transmission mode which have mutually perpendicular polarization planes, such that said polarization planes are maintained;
   a light transmitter/receiver portion for producing said first and second linearly polarized beams such that said beams have different frequencies, and directing said first and second linearly polarized beams to said optical fiber means so that the beams are transmitted in said respective two transmission modes in a first direction from a proximal end of the optical fiber means to a distal end thereof, said light transmitter/receiver portion receiving and detecting a reference and a measuring beam which have been returned through said optical fiber means in a second direction from said distal end toward said proximal end;

a sensor head portion operable to receive said first and linearly polarized beams transmitted through said optical fiber means in said first direction, and split the received beams into said reference and measuring beams, such that each of said reference and measuring beams consists of two components having mutually perpendicular polarization planes corresponding to those of said first and second linearly polarized beams, said sensor head portion causing a transmission parameter of at least said measuring beam to be influenced by a change of an external subject, combining the reference and measuring beams, and returning the combined beams to said light transmitter/receiver portion through said optical fiber means in said direction;

said sensor head portion including means for rotating by 90 degrees of the polarization planes of said two components of one of said reference and measuring beams, in opposite direction, before said reference and measuring beams are combined and are incident upon said distal end of said optical fiber means in said second direction, for transmission through said optical fiber means in said second direction; and said optical fiber means consisting of a first optical fiber for transmitting said first and second linearly polarized beams in said first direction, and a second optical fiber for transmitting said reference and measuring beams in said second direction.

7. An optical fiber sensor according to claim 6, wherein said light transmitter/receiver portion comprises a laser source for producing said first and second linearly polarized beams a polarizing beam splitter for receiving said reference and measuring beams which have been emitted from the proximal end of said second optical fiber in said second direction, a first photosensor for receiving one of said two components of said reference beam and one of said two components of said measuring beam having the same polarization plane as said one component of the reference beam, a second photosensor for receiving the other components of said reference and measuring beams and a detecting circuit for obtaining a difference between output frequencies of said first and second photosensors.

8. An optical fiber sensor according to claim 6, wherein said sensor head portion comprises a non-polarizing beam splitter receiving said first and second linearly polarized beams from the distal end of said first optical fiber, and splitting the received first and second linearly polarized beams into said reference and measuring beams such that one of said reference and measuring beams is transmitted through said non-polarizing beam splitter while the other of the reference and measuring beams is reflected by said non-polarizing beam splitter, said sensor head portion further comprising a first mirror for reflecting said other of the reference and measuring beams, in a direction parallel to a direction of propagation of said one of the reference and measuring beams, and a second mirror for reflecting said reference and measuring beams which have been transmitted through and reflected by said non-polarizing beam splitter, said reference and measuring beams reflected by said second mirror being directed to the distal end of said second optical fiber.

* * * * *